United States Patent [19]

Hashimoto et al.

[11] Patent Number: 4,627,023

[45] Date of Patent: Dec. 2, 1986

[54] WORD INFORMATION RETRIEVAL SYSTEM USING VIDEO STORAGE MEDIUM

[75] Inventors: Shintaro Hashimoto, Ikoma; Mitsuhiro Saiji, Soraku, both of Japan

[73] Assignee: Sharp Kabushiki Kaisha, Osaka, Japan

[21] Appl. No.: 418,014

[22] Filed: Sep. 14, 1982

[30] Foreign Application Priority Data

Sep. 22, 1981 [JP] Japan ............................. 56-150301
Sep. 24, 1981 [JP] Japan ............................. 56-151837
Oct. 12, 1981 [JP] Japan ............................. 56-163220

[51] Int. Cl.⁴ .................... G06F 15/02; G06F 15/40
[52] U.S. Cl. ................................. 364/900; 364/419
[58] Field of Search ... 364/200 MS File, 900 MS File, 364/419

[56] References Cited

U.S. PATENT DOCUMENTS

| 3,865,478 | 2/1975 | Ooue et al. | 353/26 R |
|---|---|---|---|
| 4,158,236 | 6/1979 | Levy | 364/900 |
| 4,218,760 | 8/1980 | Levy | 364/900 |
| 4,383,307 | 5/1983 | Gibson, III | 364/900 |

*Primary Examiner*—Thomas M. Heckler
*Attorney, Agent, or Firm*—Birch, Stewart, Kolasch & Birch

[57] ABSTRACT

An information retrieval system for an electronic dictionary includes the capability of displaying a selected batch of alphabetically-ordered words containing a word entered by a keyboard, and the definitions thereof on the screen of a television set. The entry word and the associated definition thereof is then automatically highlighted on the screen of the television set.

9 Claims, 13 Drawing Figures

|   |   |   |   |
|---|---|---|---|
| 0 | 0 | 0 | 1 |
| 0 | 0 | 0 | 0 |
| 0 |   |   |   |

M M

| Frame No. | Spelling |
|---|---|
| 1 | a |
| 2 | abode |
| 3 | about |

MU (Memory Unit)

FIG. 6　　　　FIG. 5

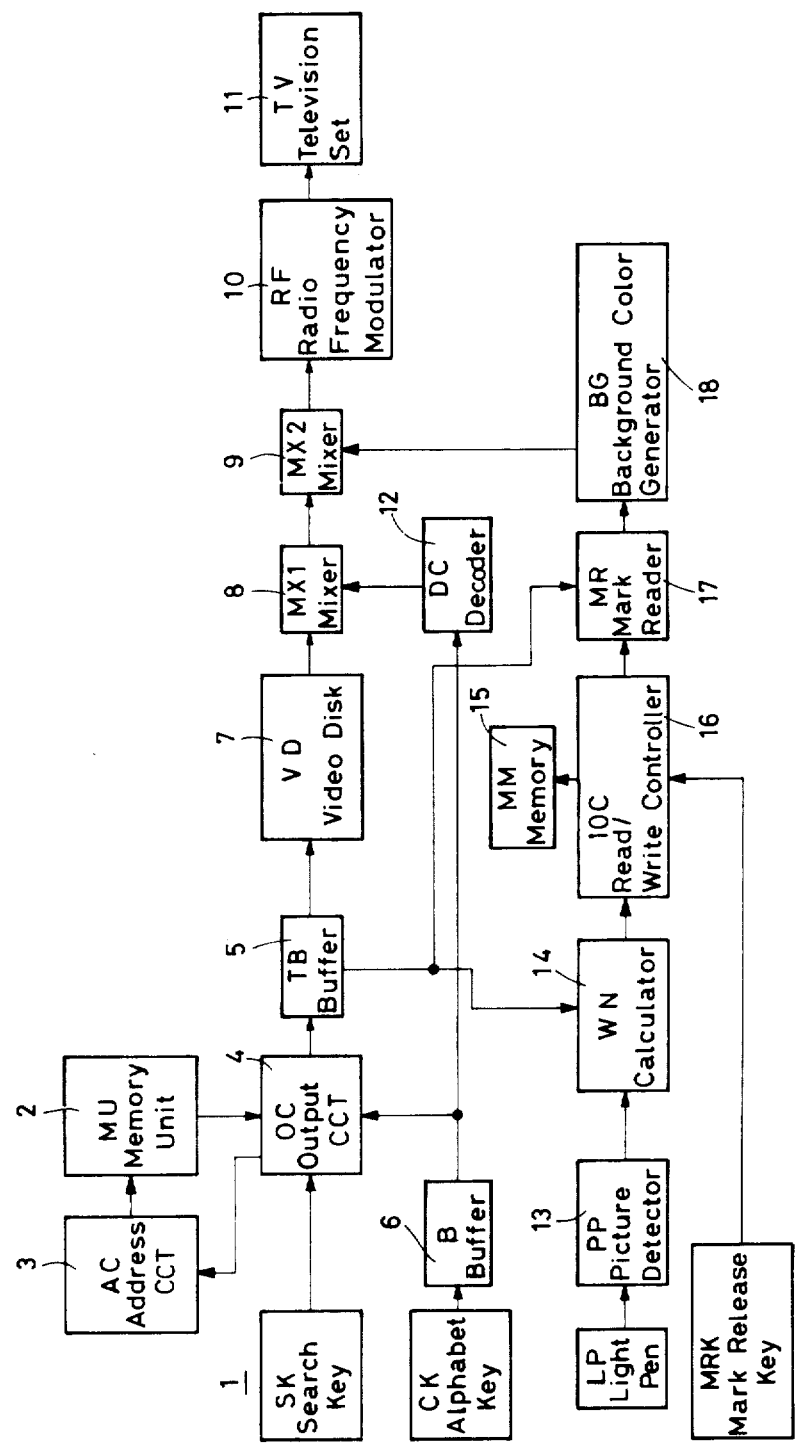

MU (Memory Unit)

| Track No. | Spelling |
|---|---|
| 1 | a |
| 2 | abbey |
| 3 | |
| ⋮ | ⋮ |

FIG.10

MM (Memory)

| Track No. | Code | | | |
|---|---|---|---|---|
| 1 | 3 | 0 | 2 | 0 |
| 2 | | | | |
| 3 | | | | |
| ⋮ | | | | |

FIG.11

WORD INFORMATION RETRIEVAL SYSTEM USING VIDEO STORAGE MEDIUM

BACKGROUND OF THE INVENTION

The present invention relates to an information retrieval system and, more particularly, to an information retrieval system equipped with a randomly-accessible memory medium such as a video disk or a video tape recorder.

Recently, electronic devices called electronic dictionaries have become available on the market. These electronic dictionaries require efficient and rapid retrieval of word information stored in a ROM. An example of such electronic dictionaries is disclosed in Levy U.S. Pat. No. 4,158,236, June 12, 1979, "ELECTRONIC DICTIONARY AND LANGUAGE INTERPRETER". The disclosure of this patent is incorporated herein by reference.

However, the capacity of a ROM is rather small.

The present invention is concerned with the use of a video storage medium, such as a video disk or a video tape recorder, as part of an improved information retrieval system. A video storage medium allows large quantities of information to be stored and rapidly accessed. The information may be stored in the form of video data, in which case the information can be displayed on a video monitor.

When, the video monitor displays a video picture containing a plurality of entry words, conventionally, it is rather troublesome for the operator to instantly find a specific entry word, which is selected, from the plurality of entry words.

Therefore, it is desired to improve word information retrieval pictures to be displayed on the video monitor.

SUMMARY OF THE INVENTION

Accordingly, it is an object of the present invention to provide an improved word information retrieval system using a video storage medium.

It is another object of the present invention to provide an improved word information retrieval picture to be displayed on a video monitor with a video storage medium such as a video disk or a video tape recorder.

Briefly described, in accordance with the present invention, an information retrieval system adapted for an electronic dictionary comprises an input device actuated for entering an entry word, a memory adapted for storing a word equivalent to the entry word and the number of a video track on a video recording medium related to the word, a video device for recording on the medium information related to the entry word, the information being randomly accessible, and an access circuit responsive to the number of the video track specified by the memory for accessing the video device to selectively retrieve batches of information from the video device. A display device is provided for selectively displaying the word information as specified by the input device with respect to other word information in the batch.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 5 shows a table for retrieving information stored in a video disk used in another specific form of the present invention;

FIG. 6 shows the contents of a mark memory used in another specific form of the present invention;

FIG. 7 shows a block diagram of a retrieval circuit according to another specific form of the present invention;

FIG. 10 shows the contents of an entry memory used in the further specific form of the present invention; and FIG. 11 shows the contents of a memory used in the further specific form of the present invention.

DESCRIPTION OF THE INVENTION

A video storage medium used for the present invention can be selected from a video disk, a video tape or the like. The description of the present invention hereinafter will be extended in terms of the video disk. However, it may be evident that any other type of video storage medium including the video tapes can be employed for the present invention.

Figure 1A:
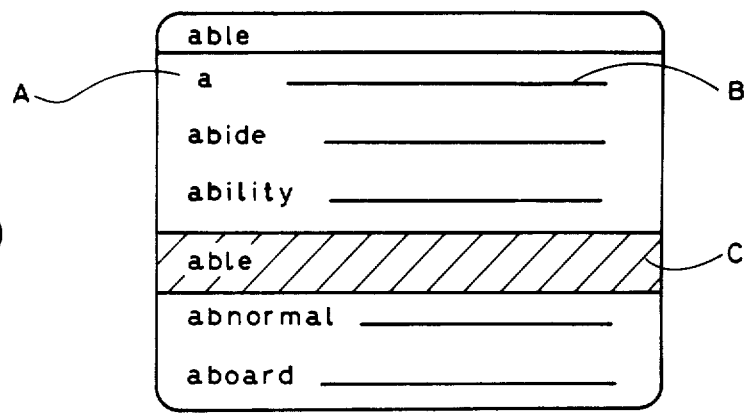
FIGS. 1(A) and 1(B) show examples of a still retrieval picture displayed on a video monitor television used in a specific form of the present invention.
Figure 1B:
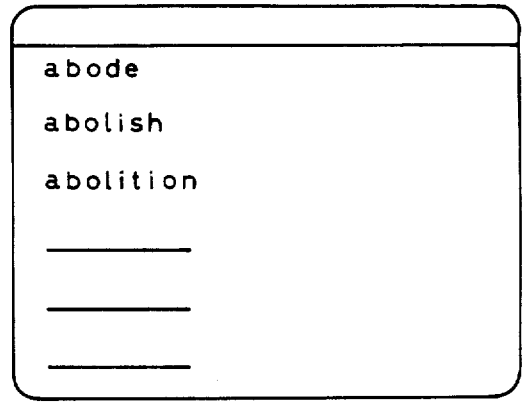

FIGS. 1(A) and 1(B) show examples of a still retrieval picture displayed on a video monitor television.

FIG. 1(A) shows a picture containing an English word "able" in response to the retrieval selection of this word. The background color of an area surrounding the English word "able" in the picture of FIG. 1(A) is different from the background color of the remaining area of this picture. Each retrieval picture contains the inputted entry word at the top of the picture and six entry words referred to as A. Every one of the six entry words is positioned with a common interval from another of these words.

Although not specifically shown in FIG. 1(A), the respective entry words are accompanied by word information referred to as B such as their translated words, and/or the description of the entry words. To select the English word "able", this word is inputted with a keyboard. The difference in the background color referred to as C for the word "able" as shown in FIG. 1(A) serves to identify the selected entry word.

FIG. 1(B) shows another example of the retrieval picture.

Figure 2:
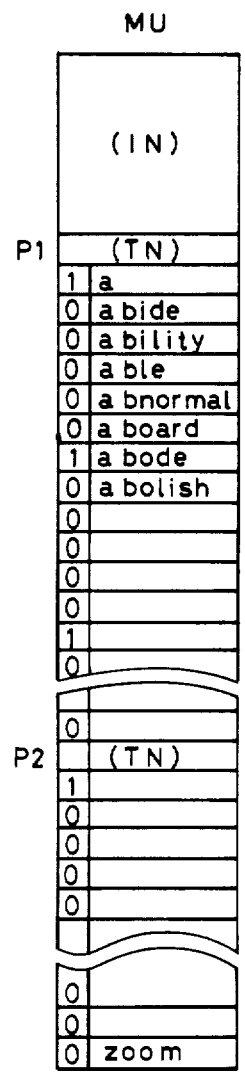
FIG. 2 shows the contents of a memory unit used in the specific form of the present invention.
Figure 3:
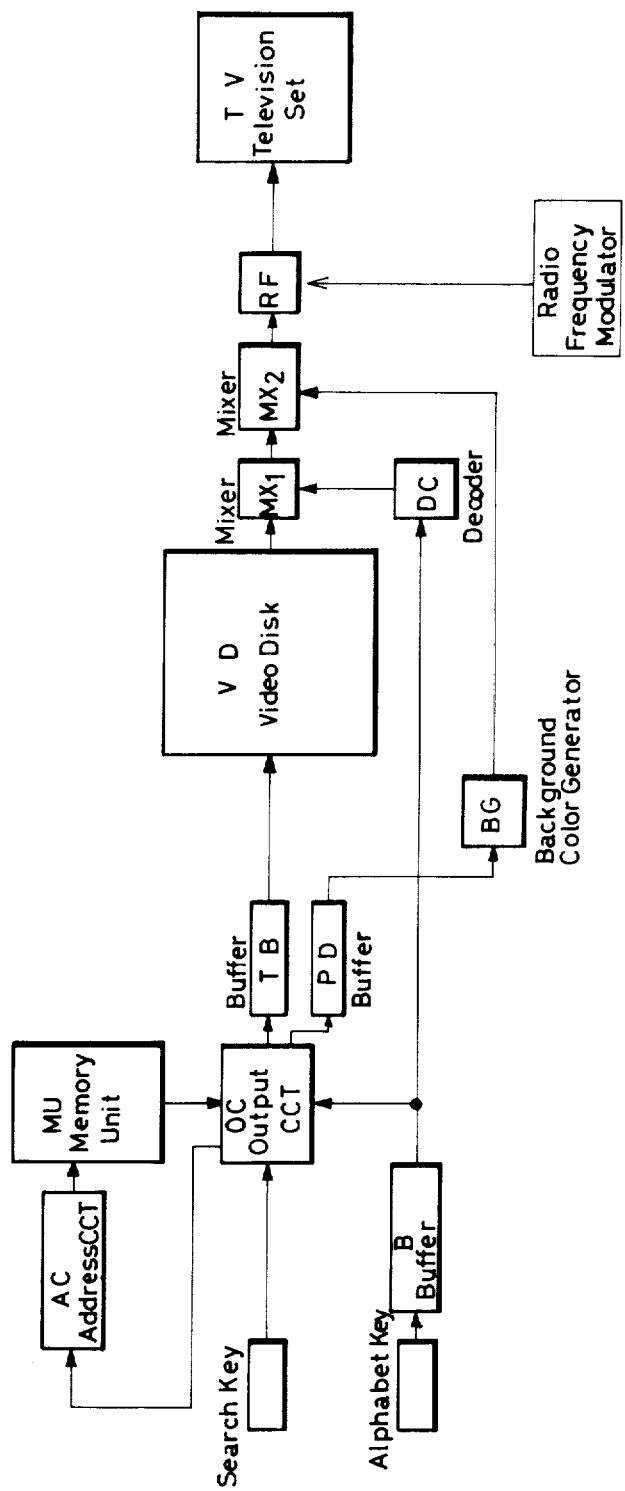
FIG. 3 shows a block diagram of a retrieval circuit according to the specific form of the present invention.

FIG. 2 shows the contents of a memory unit (MU in FIG. 3). The memory unit comprises a read only memory (ROM). Using the information as stored in the memory unit, the stored information of a video disk is retrieved. The memory unit stores spellings of a plurality of entry words in the A–Z alphabetical arrangement. A "1" bit adjacent some entry words indicates that these entry words are to be displayed at the top, uppermost position of the retrieval picture. A "0" bit adjacent to the remaining entry words indicates that the remaining entry words are to be displayed at 2–6 positions of a six word list in the retrieval picture.

In FIG. 2, TN indicates a track number of the video disk for specifying a picture containing a just subsequent entry word. Each track of the video disk contains a few pictures. IN indicates a table for storing a leading address of words grouped with first and second leading alphabets of the words. The selection of a word "able" enables the table IN to develop a specific address (location $P_1$) for storing a track number to specify some entry words starting with "ab". Based upon "ab" as an entry word, a plurality of entry words are subsequently developed so that the entry words developed are compared with an inputted entry word. The respective entry words are divided by separation codes.

FIG. 3 shows a retrieval circuit according to a specific form of the present invention. The circuit comprises a search key, a plurality of alphabet keys, the memory unit MU, an address circuit AC, an output circuit OC, buffers TB, PD and B, a video disk VD, mixers MX1 and MX2, a decoder DC, a background color generator BG, a radio frequency modulator RF, and a television set TV.

The search key is actuated to cause the retrieval of the memory unit MU. The plurality of alphabet keys are actuated to input a specific entry word. The memory unit MU stores the data of FIG. 2 as stated above. The addresses circuit AC address the information of the memory unit MU. The output circuit OC is provided for controlling the output of information from the memory unit MU.

The buffer TB stores a track number developed by the memory unit MU. The buffer PD stores location information for indicating where a specific entry word is located in the retrieval picture. The buffer B stores the specific entry word inputted by the alphabet keys. The decoder DC is provided for decoding the contents of the buffer B. The background color generator BG generates color signals for controlling a background color of the retrieval picture to distinguish a specific entry word from the remaining entry words. The television set TV is provided for displaying the retrieval picture.

In operation, the alphabet keys are operated to input a specific entry word. The search key is operated to start the retrieval of an entry word from the memory unit MU. The output circuit OC enables the table of the memory unit MU to develop the entry word corresponding to the entry word stored in the buffer B. The track of the entry word number developed from the memory unit MU is stored in the buffer TB. The location information developed from the memory unit MU is stored in the buffer PD.

The location information is a serial number of a specific entry word among the six entry words which a single frame of the retrieval picture contains. Since the six entry words are stored in the memory unit MU as shown in FIG. 2, the location information (the serial number) of the specific entry word is provided by the memory unit MU.

In the video disk VD, information such as word information is memorized in the form of digital codes in tracks. The video disk VD is responsive to the track number in the buffer TB for picking up the track as specified by the track number to thereby develop video signals. The entry word stored in the buffer B is decoded by the decoder DC. The mixer MX1 mixes the thus decoded information. Therefore, the inputted entry word is superimposed at the top of the retrieval picture.

Responsive to the location information stored in the buffer PD, the background color generator BG provides video color signals for changing the background color of the entry word corresponding to the inputted entry word from that of the remaining entry words. The mixer MX2 mixes the color signals. The radio frequency modulator RF transmits the mixed information by the mixers MX1 and MX2.

The television set TV is responsive to the radio frequency modulator RF for displaying the retrieval picture.

Figure 4:
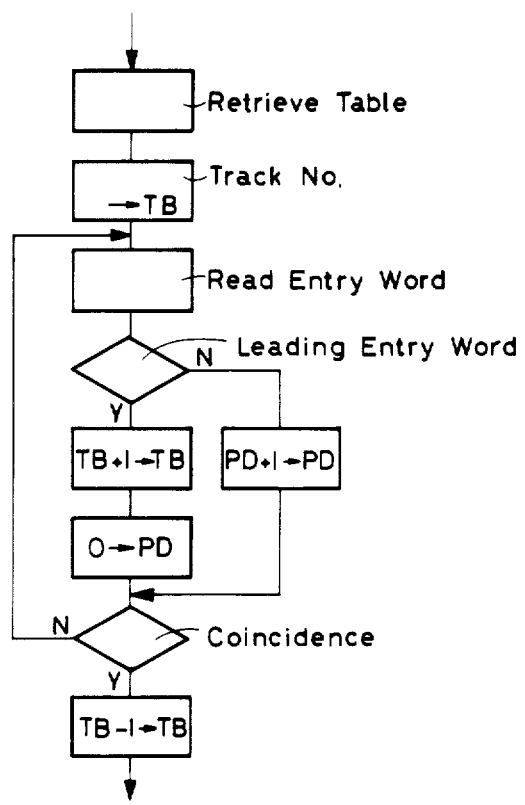
FIG. 4 shows a flow chart of the retrieval operation of the circuit of FIG. 3.

FIG. 4 shows a flow chart of the retrieval operation of the circuit of FIG. 3. The table of the memory unit MU is retrieved alphabetically by the first and the second leading letters of the inputted entry word. The track number is addressed and developed, so that it is stored in the buffer TB.

The entry words following the track number developed are read out. When one of the entry words is to be positioned at the first position of the six entry words, the track number is counted up to thereby reset the buffer PD. When one of the entry words is not to be positioned at the first position of the six entry words, the buffer PD is subsequently counted up. The coincidence between the inputted entry word and subsequent one of the entry words is confirmed. When the coincidence is detected, "TB-1" is calculated so that the results are inputted into the buffer TB. The substraction of "1" at the last stage results from the addition of "1" after the leading entry word is lead out.

It may be possible that the background color generator BG is replaced by any other elements so long as the inputted entry word is distinguished from the remaining entry words.

One of such other elements may be a means for adding a speficic symbol into the entry word corresponding to the inputted entry words.

An attention is directed to another specific form of the present invention. FIG. 5 shows a table for retrieving information stored in a video disk. The table is stored in a memory unit MU.

A picture referred to frame number 1 in the memory unit MU contains words covering "a" to a word just preceding "abode". Another picture referred to frame number 2 in the memory unit MU contains words covering "abode" to a word just preceding "about". A single still picture corresponds to a single track. Relying upon the table, a specific frame number (namely, a track number) to be outputted is retrieved. The memory unit MU does not store any information of the frame number as fixed information. The information of the frame number is obtained by counting a serial number of the frames.

FIG. 6 shows the contents of a mark memory MM. The mark memory MM stores a number of pieces of a one-bit information each corresponding to a single entry word. The set condition of the one-bit information indicates that the related entry word is marked. The example of FIG. 6 indicates that a fourth entry word is marked as shown in FIG. 1(A).

FIG. 7 shows a retrieval circuit used in another specific form of the present invention. The retrieval circuit comprises a keyboard 1 containing a search key SK, alphabet keys CK, a light pen LP and a mark release key MRK.

The circuit further comprises the memory unit (MU) 2, an address circuit (AC) 3, an output circuit (OC) 4, buffers (TB) 5 and (B) 6, a video disk (VD) 7, mixers (MX1 and MX2 8 and 9, a radio frequency modulator (RF) 10, a television set (TV) 11, a decoder (DC) 12, a picture detector (PP) 13, a calculator (WN) 14, the mark memroy (MM) 15, a read/write controller (IOC) 16, a mark reader (MR) 17, and a background color generator (BG) 18.

The MU 2 contains the information as shown in FIG. 5. The AC 3 addresses the information of the MU 2. The OC 4 controls to read the information from the MU 2. The TB 5 stores the track number when the MU 2 develops the track number by retrieval operation. The B 6 buffers a specific entry word inputted by the alphabet keys CK. The VD 7 functions to pick up a track whose track number is selected, to thereby provide video signals.

To DC 6 decodes the specific entry word stored in the B 6. The PP 13 detects a picture location by detecting information inputted by the light pen LP. Responsive to the outputs from the PP 13 and the TB 5, the WN 14 calculates a serial number of a specific entry word selected. The MM 15 stores the mark information as indicated in FIG. 6. The IOC 16 is provided for controlling the read/write operation for the MM 15. The MR 17 controls to read mark information from the MM 15. Responsive to the output from the MR 17, the BG 18 provides color signals for changing the background of a marked entry word and its contents from the remaining background.

In operating the circuit of FIG. 7, the alphabet keys CK are actuated to enter a specific entry word. Responsive to the actuation of the search key SK, the OC 4 retrieves a word equivalent to the specific entry word stored in the B 6, from the table of the MU 2. The OC 4 detects a track number of the word with reference to the alphabetical arrangement of entry words and outputs the track number into the TB 5.

Responsive to the contents of the TB 5, the VD 7 picks up a track specified by the track number detected to thereby provide the video signals.

The MR 17 reads a specific item of mark information in the MM 15, corresponding to the track number as specified in the contents of the TB 5. This means that it is read out whether the presently displayed picture contains a marked entry word or not. Responsive to the specific item of mark information applied to the mark reader MR, the BG 18 provides background video signals with the color signals for distinguishing the background of a marked entry word from that of a nonmarked entry word. The MX2 9 mixes the video signals from the VD 7 and the background video signals for superimposing purposes.

The DC 12 decodes the specific entry word stored in the B 6. The MX1 8 mixes the video signals from the VD 7 and the decoded information of the DC 12 for superimposing surposes. Thus, the information specified by the keyboard 1 is displayed at a specific location of the retrieval picture.

While a desired picture is displayed, a desired specific entry word can be marked with the light pen LP. The light pen LP is contacted with a region containing the desired specific entry word. The WN 14 is responsive to the outputs of the PP 13 and the TB 5 for calculating the picture location as specified by the contents of the PP 13 in the retrieval picture covering the serial number of the specific entry word as specified by the track number of the TB 5. Responsive to the output of the WN 15, a bit of the MM 15 is set to be marked while the information of the MM 15 is read/written. Then, the retrieval picture is displayed on the screen of the TV 11 with the selected region of the entry word being marked having the background color different from the remaining region.

To release the mark of the entry word, the mark release key MRK and the light pen LP are successively actuated. The selection of the light pen LP enables the bit of the MM 15 to be reset.

A further attention is directed to a further specific form of the present invention. Additional information used in the further specific form of the present invention means information different from translated words of the entry words. The additional information includes importance degrees of the entry words, language fields of the entry words, educational degrees in which the entry words should be used, and verbal information indicating whether any one of the entry words is pronounced or not.

A kind of additional information used in the further specific form of the present invention means types of the above described additional information, ranking of the importance degrees of the entry words, and detailed ranking of the educational degrees.

Additional display means used in the further specific form of the present invention represents an adding means for adding a background color for one of the entry words, adding an underline for said one, and coloring the letters of said one.

Figure 8A:
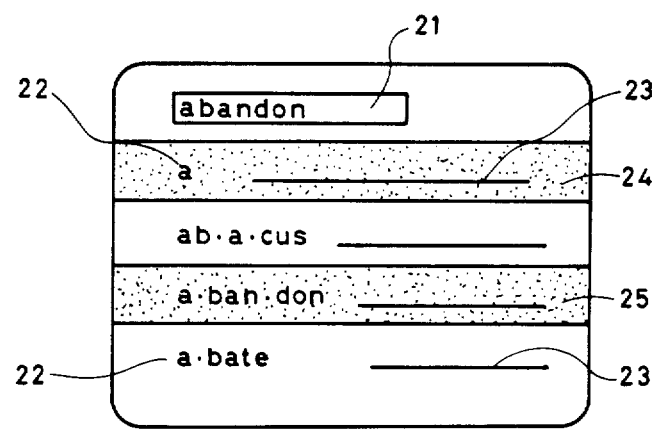
FIGS. 8(A) and 8(B) show examples of a still retrieval picture displayed on a video monitor television used in a further specific form of the present invention.
Figure 8B:
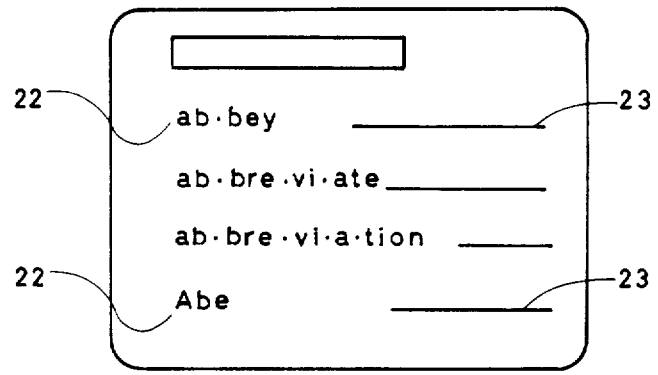

FIGS. 8(A) and 8(B) show examples of the still retrieval picture. FIG. 8(A) shows a first picture in the alphabetical arrangement of the entry words. FIG. 8(B) shows a second picture in this arrangement. In FIGS. 8(A) and 8(B), the retrieval picture contains regions 21, 22, 23, 24 and 25. In the region 21, an input entry word is displayed. In the region 22, an entry word is displayed. In the region 23, information concerning a translated word is displayed.

In the regions 24 and 25, the importance degrees are displayed in which the background colors in the regions 24 and 25 are different from the remaining background color. The hues of the background colors in the regions 24 and 25 are changed to provide ranking of the importance degrees.

Figure 9:
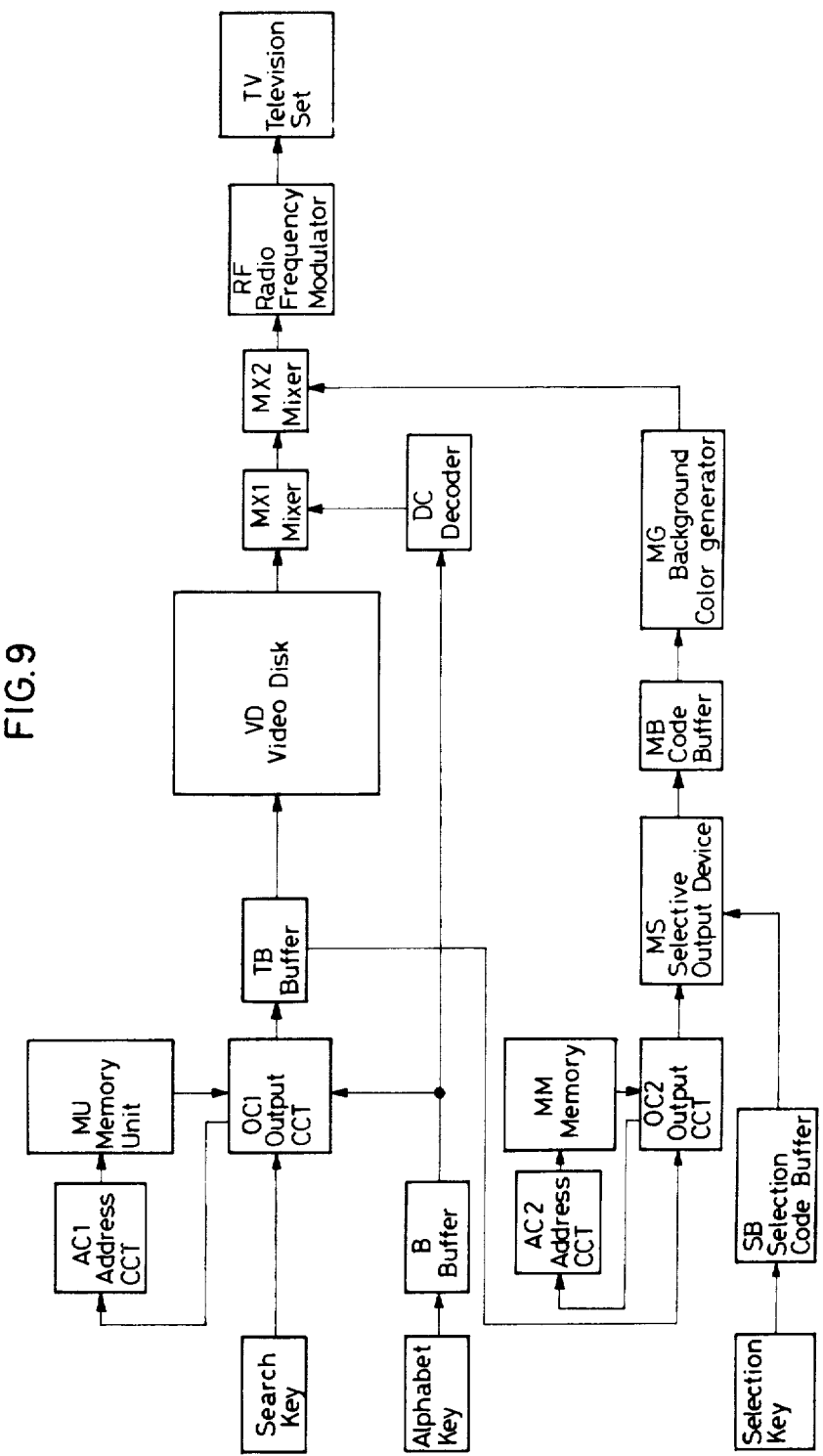
FIG. 9 shows a block diagram of a retrieval circuit according to the further specific form of the present invention.

FIG. 9 shows a retrieval circuit used in the further specific form of the present invention.

The retrieval circuit comprises a keyboard containing a search key, alphabet keys and a selection key. After the alphabet keys are operated to input a specific entry word, for example, "abandon", the search key is actuated to display the retrieval picture of FIG. 8(A). A single retrieval picture covers four entry words and their translated words having a same interval from one another of the entry words. The selection key is operated to set ranking of the importance degrees.

The retrieval circuit further comprises a memory unit MU, address circuits AC1 and AC2, output circuits OC1 and OC2, buffers TB and B, a memory M, a video disk VD, mixers MX1 and MX2, a radio frequency modulator RF, a decoder DC, a television set TV, a selection code buffer SB, a selective output device MS, a code buffer MB and a background color generator MG.

FIG. 10 shows the contents of the memory unit MU for storing the spelling of each of a leading entry word to be positioned at the first entry word (except the input entry word) in the retrieval picture.

FIG. 11 shows the contents of the memory MM for storing codes for ranking the importance degree concerning each of the entry words in the retrieval pictures. As to track number 1 related to the retrieval picture of FIG. 1(A), the first entry word "a" has an importance degree of "3", the third entry word "abandon" has an importance degree of "2", and the remaining entry words have an importance degree of "0" in which no ranking display is specified.

In operating the retrieval circuit of FIG. 9, the alphabet keys are actuated to input a specific entry word. The buffer B receives the information of this word which is decoded by the decoder DC.

The mixers MX1 and MX2 are operated to superimpose the input entry word at a particular position of the retrieval picture on the television set TV.

The search key is actuated so that the output circuit OC1 retrieves a word equivalent to the input entry word in the buffer B from the table of the memory unit MU. Since the entry words are stored in the memory unit MU in the alphabetical arrangement, the entry words except the leading entry word in the retrieval picture can be retrieved to obtain the corresponding track number. The corresponding track number is inputted into the buffer TB. The video disk VD is responsive to the detected tracknumber for picking up a specific track and providing video signals. The input entry word in the buffer B is mixed with the information from the video disk VD by the mixer MX1, so that input entry word is displayed at the region 21 of FIG.1(A) on the screen of the television set TV.

The contents of the memory MM are entered into the selective output device MS and, finally, the mixer MX2 through the code buffer MB and the background color generator MG. The importance degree is additionally displayed. When the selection key is operated to select ranking of the importance degree, the selective output device MS operates so that, among the codes generated from the memory MM representative of the importance degree, codes equal to or more than the selected code of the importance degree are unchanged and codes less than the selected code are set to be "0". The unchanged code and the "0" code are inputted into the code buffer MB.

In an additional form of the further specific form of the present invention, it may be possible that a selected group of codes can be retrieved from the memory MM, the selected group of codes having a degree of the importance degree or more, and some entry words corresponding to the selected group of codes can be displayed.

When only certain embodiments of the present invention have been described, it will be apparent to those skilled in the art that various changes and modifications may be made therein without departing from the spirit and scope of the invention as claimed.

What is claimed is:

1. An information retrieval system for an electronic dictionary comprising:
    input means for entering an entry word into a buffer memory of the system;
    word list memory means for storing a list of words arranged in alphabetical order in a plurality of alphabetically-ordered batches, the entry word being contained in one of said batches, said word list memory means also storing address information with respect to locations of each batch of words on an associated video recording medium;
    video means including said video recording medium for storing said alphabetically-ordered batches of words at respective locations designated by the address information in the word list memory means, and definitions of each word of each batch;
    access means responsive to the entry word entered into the buffer memory and said address information stored in the word list memory means for retrieving a batch of words from the video recording medium which contains the entry word;
    display means for simultaneously displaying, on a display screen, the batch of words containing the entry word retrieved by the access means, and
    means for highlighting a region of the display screen containing the entry word and the definition thereof.

2. The system of claim 1, wherein said video means includes a television set as the display means.

3. The system of claim 2 wherein the batch of words retrieved by the access means is displayed as a still picture on the display screen.

4. The system of claim 3, wherein said means for highlighting includes color generator means for creating a unique background color in the highlighted region on said display screen.

5. The system of claim 3, wherein said means for highlighting is a light pen.

6. The system of claim 2, wherein said means for highlighting includes color generator means for creating a unique background color in the highlighted region on said display screen.

7. The system of claim 2, wherein said means for highlighting is a light pen.

8. The system of claim 1, wherein said means for highlighting includes color generator means for creating a unique background color in the highlighted region on said display screen.

9. The system of claim 1, wherein said means for highlighting is a light pen.

* * * * *